(12) United States Patent
Yin et al.

(10) Patent No.: US 8,922,913 B2
(45) Date of Patent: Dec. 30, 2014

(54) FIVE-ASPHERIC-SURFACE WAFER-LEVEL LENS SYSTEMS HAVING WIDE VIEWING ANGLE

(71) Applicant: OmniVision Technologies, Inc., Santa Clara, CA (US)

(72) Inventors: Chuen-Yi Yin, New Taipei (TW); Jau-Jan Deng, Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 42 days.

(21) Appl. No.: 13/889,837

(22) Filed: May 8, 2013

(65) Prior Publication Data

US 2014/0334016 A1    Nov. 13, 2014

(51) Int. Cl.
*G02B 9/12* (2006.01)
*G02B 9/60* (2006.01)
*G02B 13/00* (2006.01)

(52) U.S. Cl.
CPC ........ *G02B 13/0045* (2013.01); *G02B 13/0085* (2013.01)
USPC .......................................... 359/763; 359/784

(58) Field of Classification Search
USPC .......................................... 359/708, 763, 784
See application file for complete search history.

(56) References Cited

U.S. PATENT DOCUMENTS

| | | | |
|---|---|---|---|
| 7,460,315 B1 | 12/2008 | Cheng et al. | |
| 7,518,810 B1 | 4/2009 | Cheng et al. | |
| 7,599,132 B1 | 10/2009 | Cheng et al. | |
| 8,000,037 B2 | 8/2011 | Hirao et al. | |
| 8,049,806 B2 | 11/2011 | Feldman et al. | |
| 8,194,334 B2 | 6/2012 | Hsu et al. | |
| 2011/0001865 A1* | 1/2011 | Hirao et al. | 348/335 |

* cited by examiner

*Primary Examiner* — Joseph P Martinez
(74) *Attorney, Agent, or Firm* — Lathrop & Gage LLP (57) ABSTRACT

A wafer-level lens system includes a first substrate, a first lens having a planar surface in contact with the first substrate and a concave aspheric surface, a second substrate, a second lens having a convex aspheric surface facing the first lens and a planar surface in contact with the second substrate, a third lens having a planar surface in contact with the second substrate and a concave aspheric surface, a third substrate, a fourth lens having a convex aspheric surface facing the third lens and a planar surface in contact with the third substrate, and a fifth lens having a planar surface in contact with the third substrate and a concave aspheric surface.

19 Claims, 5 Drawing Sheets

FIVE-ASPHERIC-SURFACE WAFER-LEVEL LENS SYSTEMS HAVING WIDE VIEWING ANGLE

BACKGROUND

1. Technical Field

This disclosure relates to wafer-level lens systems having wide viewing angles and, more particularly, to five-aspheric-surface wafer-level lens systems having wide viewing angles.

2. Discussion of Related Art

Small digital camera modules are growing in popularity and importance. In general, portable electronic devices, such as mobile telephones, tablets and notebook computers, now include small digital camera modules. A lens having short overall length is desirable for these common applications for small digital camera modules. Conventionally, the lens of a small digital camera module is a molded one-piece plastic lens. Such a conventional plastic lens allows only two surfaces with one material.

The viewing angle of a camera module is typically between about 60 degrees and about 70 degrees. There are certain restrictions to producing a lens having a viewing angle larger than 70 degrees, while maintaining a short overall lens length. For example, optical aberrations generated by the lens cannot be tolerated in typical present-day image sensors, which exhibit greatly improved resolution. Therefore, it is now desirable to have a lens system with a large viewing angle and short overall length of lens, and with an optical performance, e.g., optical aberration, that is compatible with image sensors having enhanced resolution.

A wafer-level lens is typically manufactured by forming a plurality of lenses on a wafer or substrate. The lenses are typically formed by molding and curing a lens material on the wafer or substrate. After the lenses are cured, the wafer or substrate is cut into pieces, with each piece containing at least one lens. A wafer-level lens may be formed by stacking more than one substrate together, with each substrate including at least one lens. Multiple lenses can be formed in the multiple substrates in registration with each other, such that, when the lenses and substrates are cut into pieces, One or more of the lenses can actually include multiple stacked lenses. Hence, a wafer-level lens system may include multiple substrates and multiple lenses.

SUMMARY

According to one aspect, a lens system is provided. The lens system includes a first substrate having an outside surface, a first lens having a concave aspheric surface and a focal length F1 and a second lens having a convex aspheric surface facing the first lens and having a focal length F2. A third lens has a concave aspheric surface having a focal length F3. The lens system satisfies the following conditions:

$0.2 < EFFL/TTL < 0.5;$ $-0.75 < EFFL/F1 < -0.35;$ $1 < EFFL/F2 < 1.4;$ $-0.65 < EFFL/F3 < -0.15;$ $V2 > V3$ and $V3 < 35;$ wherein: (i) EFFL is an effective focal length of the lens system; (ii) TTL is a distance from the outside surface of the first substrate to an image plane; and (iii) V2 is an Abbe number of the second lens, and V3 is an Abbe number of the third lens.

According to another aspect, a lens system is provided. The lens system includes a first substrate having an outside surface and a first lens having a planar surface in contact with the first substrate opposite to the outside surface and a concave aspheric surface. The lens system also includes a second substrate and a second lens having a convex aspheric surface facing the first lens and a planar surface in contact with the second substrate. A third lens has a planar surface in contact with the second substrate and a concave aspheric surface. The second substrate is sandwiched between the second lens and the third lens. The lens system further includes a third substrate and a fourth lens having a convex aspheric surface facing the third lens and a planar surface in contact with the third substrate. A fifth lens has a planar surface in contact with the third substrate and a concave aspheric surface. The third substrate is sandwiched between the fourth lens and the fifth lens. The lens system satisfies the following conditions:

$0.2 < EFFL/TTL < 0.5;$ $-0.75 < EFFL/F1 < -0.35;$ $1 < EFFL/F2 < 1.4;$ $-0.65 < EFFL/F3 < -0.15;$ $V2 > V3$ and $V3 < 35;$ wherein: (i) EFFL is an effective focal lens of the lens system; (ii) TTL is a distance from the outside surface of the first substrate to an image plane; (iii) F1, F2, and F3 are focal lengths of the first lens, the second lens, and the third lens, respectively; and (iv) V2 is an Abbe number of the second lens, and V3 is an Abbe number of the third lens.

According to another aspect, a wafer-level lens system is provided. The wafer-level lens system includes a first substrate having an outside surface and a first lens having a planar surface in contact with the first substrate opposite to the outside surface and a concave aspheric surface. The lens system also includes a second substrate and a second lens having a convex aspheric surface facing the first lens and a planar surface in contact with the second substrate. A third lens has a planar surface in contact with the second substrate and a concave aspheric surface. The second substrate is sandwiched between the second lens and the third lens. The lens system further includes a third substrate and a fourth lens having a convex aspheric surface facing the third lens and a planar surface in contact with the third substrate. A fifth lens has a planar surface in contact with the third substrate and a concave aspheric surface. The third substrate is sandwiched between the fourth lens and the fifth lens. The first lens, the second lens, the third lens, the fourth lens, and the fifth lens are made of reflow-compatible materials. The lens system satisfies the following conditions:

$0.2 < EFFL/TTL < 0.5;$ $-0.75 < EFFL/F1 < -0.35;$ $1 < EFFL/F2 < 1.4;$ $-0.65 < EFFL/F3 < -0.15;$ $V2 > V3$ and $V3 < 35;$ wherein: (i) EFFL is an effective focal lens of the lens system; (ii) TTL is a distance from the outside surface of the first substrate to an image plane; (iii) F1, F2, and F3 are focal lengths of the first lens, the second lens, and the third lens, respectively; and (iv) V2 is an Abbe number of the second lens, and V3 is an Abbe number of the third lens.

BRIEF DESCRIPTION OF THE DRAWINGS

The foregoing and other features and advantages of the disclosure will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the disclosure.

DETAILED DESCRIPTION

According to some exemplary embodiments, a wafer-level lens system may include a plurality of substrates and a plurality of lenses. The lenses can have independent surfaces and can be made from different reflow-compatible materials. This results in a wide viewing lens having short overall lens length and acceptable optical performance. In accordance with some particular exemplary embodiments, it is desirable that the lens systems comply with at least the following specific exemplary requirements: (1) wide viewing angle, e.g., equal to or larger than 90°, (2) short overall length of lens system, e.g., equal to or less than 5 mm, (3) low cost, e.g., including no more than five aspheric surfaces in the lens system, and (4) good optical quality, e.g., having nominal aberrations.

Figure 1:
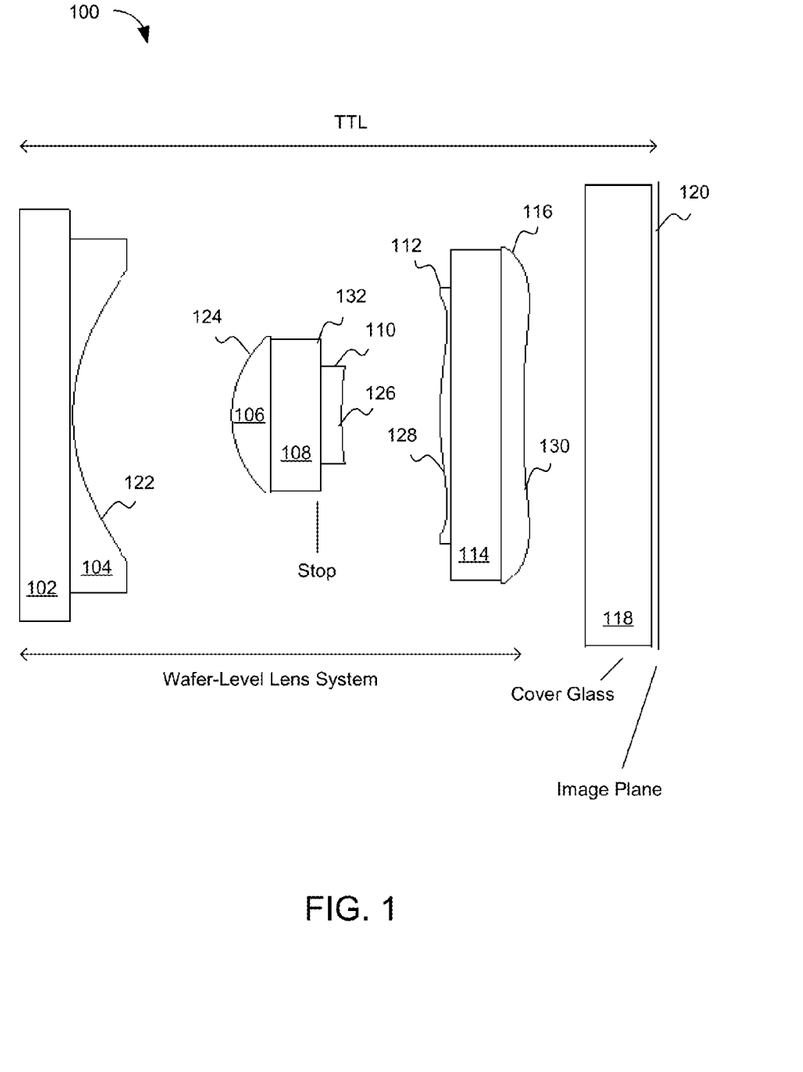
FIG. 1 includes a schematic block diagram of a five-aspheric-surface wafer-level lens system, according to some exemplary embodiments.
Figure 2A:
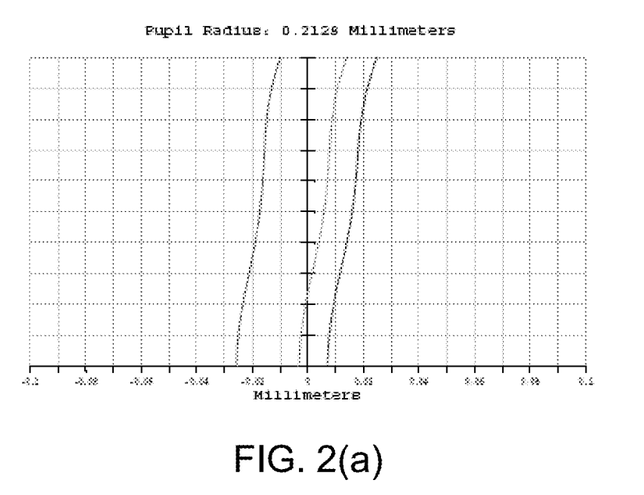
FIGS. 2(a), 2(b), 2(c), and 2(d) are curves which illustrate spherical aberration, field curvature, distortion, and lateral color aberration, respectively, for the lens system illustrated in FIG. 1, the lens data for the system being tabulated in Table 1, according to some exemplary embodiments.
Figure 2B:
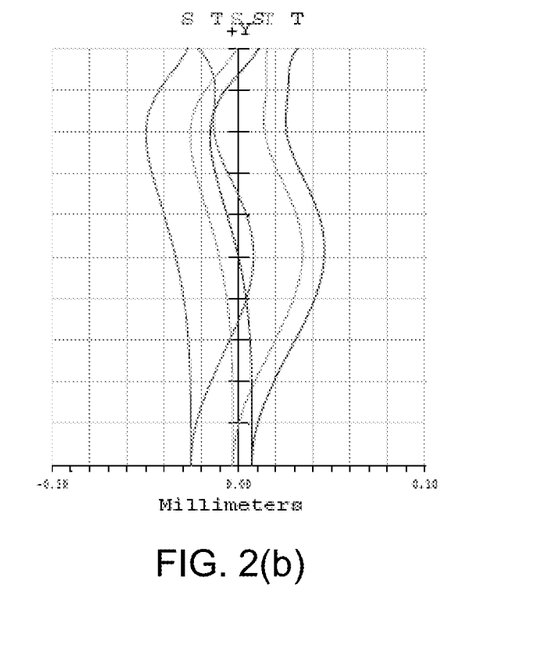
Figure 2C:
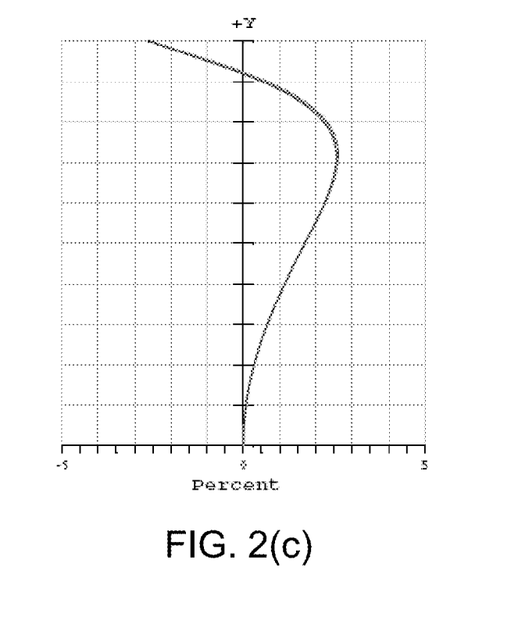
Figure 2D:
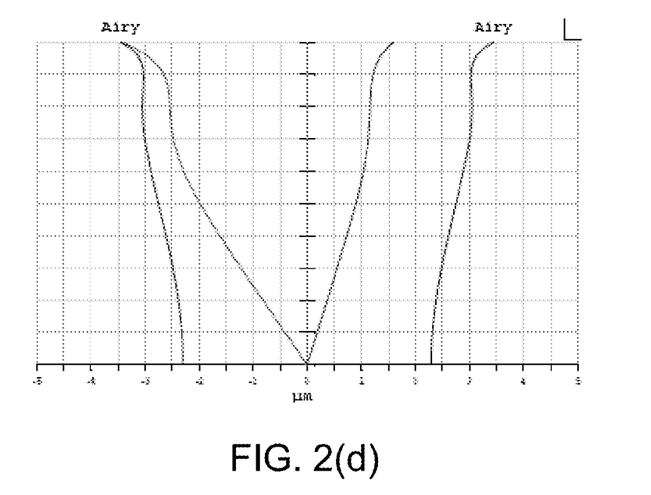

FIG. 1 includes a schematic block diagram of a wide-viewing-angle wafer-level lens system, according to some exemplary embodiments. Referring to FIG. 1, lens system 100 meets at least the four requirements listed above. Lens system 100 includes a first substrate 102, a first lens 104, a second lens 106, a second substrate 108, a third lens 110, a fourth lens 112, a third substrate 114, and a fifth lens 116. In addition, lens system 100 includes a glass plate 118 in front of an image plane 120. First substrate 102, first lens 104, second lens 106, second substrate 108, third lens 110, fourth lens 112, third substrate 114, and fifth lens 116 may be parts of a wafer-level lens system. Although this application in general and the Detailed Description in particular refer to a wafer-level lens system, it will be understood that the present disclosure is not limited to a wafer-level lens system. The disclosure can be applied to other lens manufacturing techniques.

First substrate 102 includes two parallel planar surfaces. A first planar surface of first substrate 102 is an outside surface facing toward object space. First lens 104 has a planar surface (radius L1R1=∞), which is in contact with the second planar surface of first substrate 102, which is opposite to the first surface of first substrate 102. First lens 104 also has a concave aspheric surface 122, which has a radius L1R2. First substrate 102 and first lens 104 collect incident rays with large incident angles entering lens system 100. Planar-concave first lens 104 mitigates the angle of incident rays that enter lens system 100, and reduces distortion.

Second lens 106 has a convex aspheric surface 124 having radius L2R1 facing first lens 104 and a planar surface (radius L2R2=∞). The space between first lens 104 and second lens 106 can be an air gap. The planar surface of second lens 106 is in contact with second substrate 108, which has two parallel planar surfaces. Second lens 106 conveys the light rays onto a stop 132 of lens system 100.

Third lens 110 has a planar surface (radius L3R1=∞) in contact with second substrate 108 and a concave aspheric surface 126 having a radius L3R2. Second substrate 108 is thus sandwiched between second lens 106 and third lens 110. Stop 132 is interposed between second substrate 108 and third lens 110. Stop 132 located within lens system 100 helps to maintain cones of rays in the field of view symmetric. This in turn helps to maintain the symmetric performance of the modulation transfer function (MTF). Third lens 110 leads rays to fourth lens 112 with large refractive angle, which in turn shortens the overall length of lens system 100.

Fourth lens 112 has a convex aspheric surface 128 having radius L4R1 facing third lens 110 and a planar surface (radius L4R2=∞). The space between third lens 110 and fourth lens 112 can be an air gap. The planar surface of fourth lens 112 is in contact with third substrate 114, which has two parallel planar surfaces.

Fifth lens 116 has a planar surface (radius L5R1=∞) in contact with third substrate 114 and a concave aspheric surface 130 having a radius L5R2. Third substrate 114 is thus sandwiched between fourth lens 112 and fifth lens 130. Fourth lens 112 and fifth lens 116 respectively balance and correct the aberration accumulated along light traveling paths in lens system 100.

The space between fifth lens 116 and glass plate 118 can be an air gap. Fifth lens 116 leads light rays to arrive at image plane 120 through glass plate 118. Glass plate 118 may be a cover glass of an image sensor, and image plane 120 may be the image receiving plane of the image sensor. Glass plate 118 and image plane 120 may be separated by a small distance. An image is formed on image plane 120. Glass plate 118 is disposed between fifth lens 116 and image plane 120.

Table 1 includes the lens data of a lens system 100 illustrated in FIG. 1, according to some exemplary embodiments.

TABLE 1

F/3.2; FOV = 91°; EFFL = 1.31 mm
Nd: Refractive Index; V: Abbe Number

| Lens System | Radius (mm) | Thickness (mm) | Nd | V | Conic | Aspheric Coefficient | | | | |
|---|---|---|---|---|---|---|---|---|---|---|
| | | | | | | 4th-Order Term | 6th-Order Term | 8th-Order Term | 10th-Order Term | 12th-Order Term |
| OBJ | Infinity | 0.400 | | | | | | | | |
| First Substrate | Infinity | 0.300 | 1.517 | 63 | | | | | | |

TABLE 1-continued

F/3.2; FOV = 91°; EFFL = 1.31 mm
Nd: Refractive Index; V: Abbe Number

| Lens System | Radius (mm) | Thickness (mm) | Nd | V | Conic | Aspheric Coefficient | | | | |
|---|---|---|---|---|---|---|---|---|---|---|
| | | | | | | 4th-Order Term | 6th-Order Term | 8th-Order Term | 10th-Order Term | 12th-Order Term |
| L1R1 | Infinity | 0.020 | 1.511 | 57 | | | | | | |
| L1R2 | 1.102 | 0.940 | | | −0.9867 | −0.0168 | −0.0786 | 0.1630 | −0.1001 | 0.0000 |
| L2R1 | 0.596 | 0.229 | 1.520 | 50 | −0.2828 | −0.0594 | 0.4210 | −1.1849 | 6.4260 | 0.0000 |
| L2R2 | Infinity | 0.000 | | | | | | | | |
| Second Substrate | Infinity | 0.300 | 1.517 | 63 | | | | | | |
| STO | Infinity | 0.000 | | | | | | | | |
| L3R1 | Infinity | 0.120 | 1.595 | 30 | | | | | | |
| L3R2 | 3.165 | 0.581 | | | 0.0000 | 0.8856 | −3.4430 | 84.7944 | −357.5598 | 0.0000 |
| L4R1 | 1.867 | 0.066 | 1.511 | 57 | −11.0167 | −0.1289 | −0.4469 | 0.2443 | −0.9895 | 0.0091 |
| L4R2 | Infinity | 0.0000 | | | | | | | | |
| Third Substrate | Infinity | 0.300 | 1.517 | 63 | | | | | | |
| L5R1 | Infinity | 0.129 | 1.511 | 57 | | | | | | |
| L5R2 | 8.882 | 0.363 | | | 9.1209 | 0.3333 | −0.9361 | 0.8047 | −0.4406 | 0.0602 |
| Cover Glass | Infinity | 0.400 | 1.517 | 63 | | | | | | |
| | Infinity | 0.040 | | | | | | | | |
| IMA | Infinity | 0.000 | | | | | | | | |

Lens system 100 conforming with the lens data of Table 1 meets the following five conditions.

$$0.2 < EFFL/TTL < 0.5 \quad \text{Condition (1)}$$

$$-0.75 < EFFL/F1 < -0.35 \quad \text{Condition (2)}$$

$$1 < EFFL/F2 < 1.4 \quad \text{Condition (3)}$$

$$-0.65 < EFFL/F3 < -0.15 \quad \text{Condition (4)}$$

$$V2 > V3 \text{ and } V3 < 35 \quad \text{Condition (5)}$$

EFFL is the effective focal length of wide-angle lens system 100. TTL is the total length referring the distance from the outside surface of first substrate 102 to image plane 120, where an image is formed. F1, F2, and F3 are the focal lengths of first lens 104, second lens 106, and third lens 110, respectively. V2 and V3 are the Abbe numbers of second lens 106 and third lens 110, respectively.

FIGS. 2(*a*), 2(*b*), 2(*c*), and 2(*d*) are curves which illustrate spherical aberration, field curvature, distortion, and lateral color aberration, respectively, for lens system 100 illustrated in FIG. 1 and having the lens data of Table 1, according to some exemplary embodiments. Referring to FIG. 2(*a*), the three curves, from left to right, correspond to light with wavelengths of 435.8 nm (f curve), 587.6 nm (d curve), and 656.3 nm (c curve). The spherical aberration is in a possible range which is illustrated to extend from approximately −0.03 mm to approximately 0.03 mm. Referring to the diagram of FIG. 2(*b*), the field curvature is in a possible range which is illustrated to extend from approximately −0.06 mm to approximately 0.06 mm. Referring to the diagram of FIG. 2(*c*), the distortion is in a possible range which is illustrated to extend from approximately −5% to approximately 5%. Referring to the diagram of FIG. 2(*d*), the lateral color aberration is limited within an Airy disk from approximately −4.00 μm to approximately 4.00 μm. The aberration values are nominal as understood by those of ordinary skill in the art.

In some exemplary embodiments, the characteristics of the five-aspheric-surface wafer-level lens system of lens system 100 include a field-of-view (FOV) equal to or greater than 90°, e.g., 91°, an F-number equal to or less than F/3.2, e.g., F/3.2, an effective focal length EFFL of less than or equal to 2.00 mm, e.g., 1.31 mm, and a total length TTL of less than or equal to 5.000 mm, e.g., 4.188 mm, which is the distance from the outside surface of first substrate 102 to image plane 120. For example, the exemplary embodiments illustrated in FIG. 1 of Table 1 meet the four specific exemplary requirements: (1) wide viewing angle of 91°, (2) short overall length of lens system of 4.188 mm, (3) low cost, since it comprises only five aspheric surfaces, and (4) good optical quality of nominal aberration. It is understood that the invention may not be limited by these four exemplary specifications.

In some exemplary embodiments, first lens 104, second lens 106, third lens 110, fourth lens 110, and fifth lens 116 of lens system 100 defined according to the lens data in Table 1 are made of reflow-compatible materials. It is not necessary that all of the lenses be made of the same material. Any quantity or combination of the five lenses may be made of the same materials or different materials.

Table 2 includes the lens data of a lens system 100 illustrated in FIG. 1, according to some other alternative exemplary embodiments.

TABLE 2

F/3.2; FOV = 91°; EFFL = 1.63 mm
Nd: Refractive Index; V: Abbe Number

| Lens System | Radius (mm) | Thickness (mm) | Nd | V | Conic | Aspheric Coefficient | | | | |
|---|---|---|---|---|---|---|---|---|---|---|
| | | | | | | 4th-Order Term | 6th-Order Term | 8th-Order Term | 10th-Order Term | 12th-Order Term |
| OBJ | Infinity | 0.400 | | | | | | | | |
| First Substrate | Infinity | 0.300 | 1.517 | 63 | | | | | | |
| L1R1 | Infinity | 0.020 | 1.511 | 57 | | | | | | |
| L1R2 | 1.694 | 1.157 | | | −1.2092 | −0.0276 | −0.0135 | 0.0158 | −0.0046 | −.0002 |
| L2R1 | 0.659 | 0.256 | 1.520 | 50 | −0.1514 | −0.0954 | 0.1893 | −0.9376 | 3.0400 | 0.0000 |
| L2R2 | Infinity | 0.000 | | | | | | | | |
| Second Substrate | Infinity | 0.300 | 1.517 | 63 | | | | | | |
| STO | Infinity | 0.000 | | | | | | | | |
| L3R1 | Infinity | 0.147 | 1.595 | 30 | | | | | | |
| L3R2 | 1.830 | 0.580 | | | 0.9264 | 0.7763 | −4.2115 | 60.7413 | −227.4082 | 0.0000 |
| L4R1 | 2.033 | 0.095 | 1.511 | 57 | −18.9239 | 0.0329 | −0.2040 | −0.0020 | 0.0572 | 0.0038 |
| L4R2 | Infinity | 0.0000 | | | | | | | | |
| Third Substrate | Infinity | 0.300 | 1.517 | 63 | | | | | | |
| L5R1 | Infinity | 0.191 | 1.511 | 57 | | | | | | |
| L5R2 | 19.254 | 0.541 | | | 190.8021 | 0.1543 | −0.2532 | 0.0857 | −0.0130 | −0.0035 |
| Cover Glass | Infinity | 0.400 | 1.517 | 63 | | | | | | |
| | Infinity | 0.040 | | | | | | | | |
| IMA | Infinity | 0.000 | | | | | | | | |

Lens system 100 conforming with the lens data of Table 2 also meets the following five conditions set forth above in connection with Table 1.

$$0.2 < EFFL/TTL < 0.5 \quad \text{Condition (1)}$$

$$-0.75 < EFFL/F1 < -0.35 \quad \text{Condition (2)}$$

$$1 < EFFL/F2 < 1.4 \quad \text{Condition (3)}$$

$$-0.65 < EFFL/F3 < -0.15 \quad \text{Condition (4)}$$

$$V2 > V3 \text{ and } V3 < 35 \quad \text{Condition (5)}$$

Figure 3A:
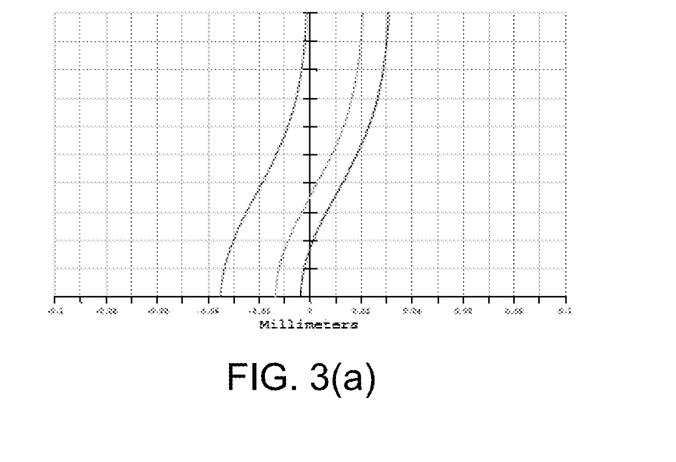
FIGS. 3(a), 3(b), 3(c), and 3(d) are curves which illustrate spherical aberration, field curvature, distortion, and lateral color aberration, respectively, for lens systems 100 illustrated in FIG. 1, the lens data for the system being tabulated in Table 2, according to some exemplary embodiments.
Figure 3B:
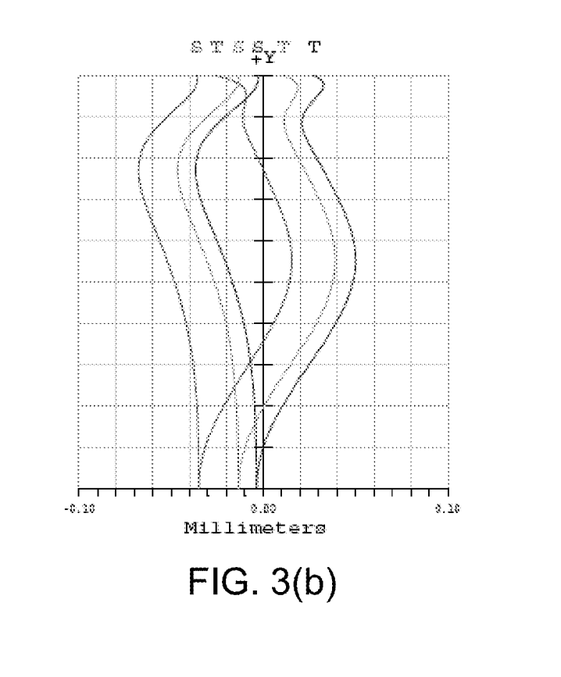
Figure 3C:
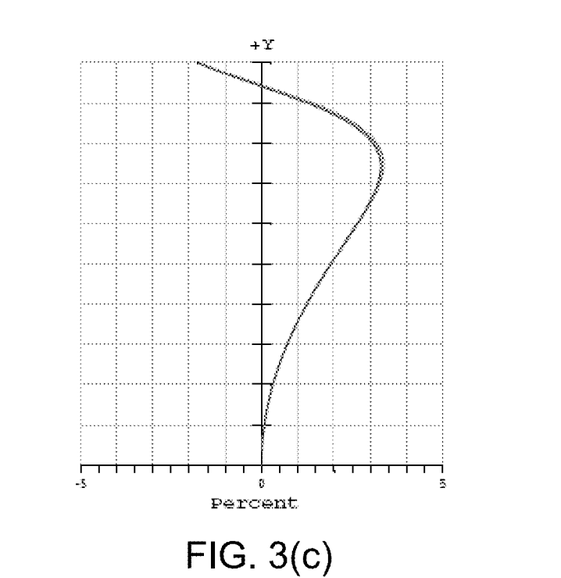
Figure 3D:
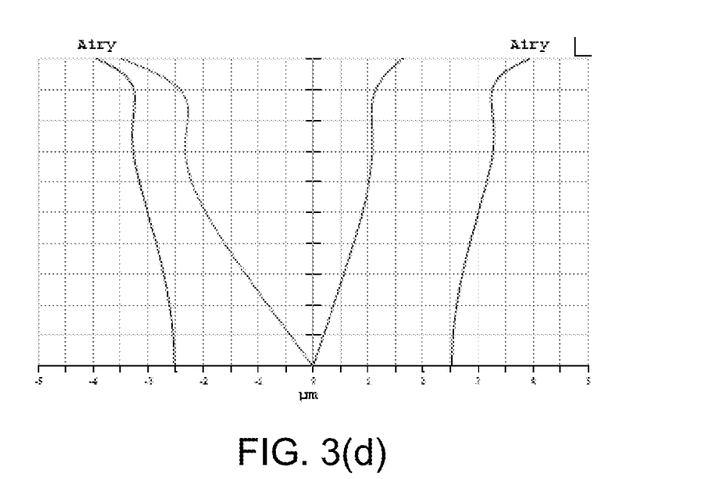

FIGS. 3(a), 3(b), 3(c), and 3(d) are curves which illustrate spherical aberration, field curvature, distortion, and lateral color aberration, respectively, for lens system 100 illustrated in FIG. 1 and having the lens data of Table 2, according to some exemplary embodiments. Referring to FIG. 3(a), the three curves, from left to right, correspond to light with wavelengths of 435.8 nm (f curve), 587.6 nm (d curve), and 656.3 nm (c curve). The spherical aberration is in a possible range which is illustrated to extend from approximately −0.04 mm to approximately 0.04 mm. Referring to the diagram of FIG. 3(b), the field curvature is in a possible range which is illustrated to extend from approximately −0.08 mm to approximately 0.08 mm. Referring to the diagram of FIG. 3(c), the distortion is in a possible range which is illustrated to extend from approximately −5% to approximately 5%. Referring to the diagram of FIG. 3(d), the lateral color aberration is limited within an Airy disk from approximately −5.00 μm to approximately 5.00 μm. The aberration values are nominal as understood by those of ordinary skill in the art.

In some exemplary embodiments, the characteristics of the five-aspheric-surface wafer-level lens system of lens system 100 include a field-of-view (FOV) equal to or greater than 90°, e.g., 91°, an F-number equal to or less than F/3.2, e.g., F/3.2, an effective focal length EFFL of less than or equal to 2.00 mm, e.g., 1.63 mm, and a total length TTL of less than or equal to 5.000 mm, e.g., 4.727 mm, which is the distance from the outside surface of first substrate 102 to image plane 120. For example, the exemplary embodiments illustrated in FIG. 1 of Table 2 meet the four specific exemplary requirements: (1) wide viewing angle of 91°, (2) short overall length of lens system of 4.727 mm, (3) low cost, since it comprises only five aspheric surfaces, and (4) good optical quality of nominal aberration. It is understood that the invention may not be limited by these four exemplary specifications.

In some exemplary embodiments, first lens 104, second lens 106, third lens 110, fourth lens 112, and fifth lens 116 of lens system 100 defined according to the lens data in Table 2 are made of reflow-compatible materials. It is not necessary that all of the lenses be made of the same material. Any quantity or combination of the five lenses may be made of the same materials or different materials.

Combinations of Features

Various features of the present disclosure have been described above in detail. The disclosure covers any and all combinations of any number of the features described herein, unless the description specifically excludes a combination of features. The following examples illustrate some of the combinations of features contemplated and disclosed herein in accordance with this disclosure.

In any of the embodiments described in detail and/or claimed herein, a stop may be interposed between the second substrate and the third lens.

In any of the embodiments described in detail and/or claimed herein, a field of view of the lens system may be equal to or greater than 90°.

In any of the embodiments described in detail and/or claimed herein, a total length of the lens system from an outer surface of the first substrate to an image plane may be equal to or less than 5 mm.

In any of the embodiments described in detail and/or claimed herein, an effective focal length of the lens system may be equal to or less than 2 mm.

In any of the embodiments described in detail and/or claimed herein, an F-number of the lens system may be equal to or less than 3.2.

In any of the embodiments described in detail and/or claimed herein, the first lens, second lens, third lens, fourth lens, and fifth lens may be made of reflow-compatible materials.

In any of the embodiments described in detail and/or claimed herein, each of the first substrate, the second substrate, and the third substrate may have two parallel planar surfaces.

In any of the embodiments described in detail and/or claimed herein, the lens system may comprise wafer-level lens system.

While the present disclosure has shown and described exemplary embodiments, it will be understood by those of ordinary skill in the art that various changes in form and details may be made therein without departing from the spirit and scope of the present disclosure, as defined by the following claims.

We claim:

1. A lens system, comprising:
   a first substrate having an outside surface;
   a first lens having a concave aspheric surface and a focal length F1;
   a second lens having a convex aspheric surface facing the first lens and a focal length F2; and
   a third lens having a concave aspheric surface and a focal length F3;
   wherein the lens system satisfies the following conditions:

$0.2 < EFFL/TTL < 0.5;$ $-0.75 < EFFL/F1 < -0.35;$ $1 < EFFL/F2 < 1.4;$ $-0.65 < EFFL/F3 < -0.15;$ $V2 > V3$ and $V3 < 35;$ wherein: (i) EFFL is an effective focal lens of the lens system; (ii) TTL is a distance from the outside surface of the first substrate to an image plane; and (iii) V2 is an Abbe number of the second lens, and V3 is an Abbe number of the third lens.

2. The lens system of claim 1, further comprising a second substrate, the second substrate being sandwiched between the second lens and the third lens.

3. The lens system of claim 2, wherein:
   the first lens further comprises a planar surface in contact with the first substrate opposite to the outside surface;
   the second lens further comprises a planar surface in contact with the second substrate; and
   the third lens further comprises a planar surface in contact with the second substrate.

4. The lens system of claim 3, further comprising a stop interposed between the second substrate and the third lens.

5. The lens system of claim 4, further comprising:
   a fourth lens having a convex aspheric surface facing the third lens;
   a fifth lens having a concave aspheric surface; and
   a third substrate, the third substrate being sandwiched between the fourth lens and the fifth lens.

6. The lens system of claim 5, wherein:
   the fourth lens further comprises a planar surface in contact with the third substrate; and
   the fifth lens further comprises a planar surface in contact with the third substrate.

7. The lens system of claim 6, wherein the first lens, the second lens, the third lens, the fourth lens, and the fifth lens are made of reflow-compatible materials.

8. The lens system of claim 6, wherein a glass plate is disposed between the fifth lens and the image plane.

9. The lens system of claim 8, wherein the glass plate is a cover glass of an image sensor.

10. The lens system of claim 6, wherein a field of view of the lens system is equal to or greater than 90°.

11. The lens system of claim 6, wherein a total length of the lens system from the outer surface of the first substrate to the image plane is equal to or less than 5 mm.

12. The lens system of claim 6, wherein an effective focal length of the lens system is equal to or less than 2 mm.

13. The lens system of claim 6, wherein an F-number of the lens system is equal to or less than 3.2.

14. The lens system of claim 6, wherein each of the first substrate, the second substrate, and the third substrate has two parallel planar surfaces.

15. The lens system of claim 6, wherein the lens system comprises a wafer-level lens.

16. A lens system, comprising:
   a first substrate having an outside surface;
   a first lens having a planar surface in contact with the first substrate opposite to the outside surface and a concave aspheric surface;
   a second substrate;
   a second lens having a convex aspheric surface facing the first lens and a planar surface in contact with the second substrate;
   a third lens having a planar surface in contact with the second substrate and a concave aspheric surface;
   wherein the second substrate is sandwiched between the second lens and the third lens;
   a third substrate;
   a fourth lens having a convex aspheric surface facing the third lens and a planar surface in contact with the third substrate; and
   a fifth lens having a planar surface in contact with the third substrate and a concave aspheric surface;
   wherein the third substrate is sandwiched between the fourth lens and the fifth lens;
   wherein the lens system satisfies the following conditions:

$0.2 < EFFL/TTL < 0.5;$ $-0.75 < EFFL/F1 < -0.35;$ $1 < EFFL/F2 < 1.4;$ $-0.65 < EFFL/F3 < -0.15;$ $V2 > V3$ and $V3 < 35;$ wherein: (i) EFFL is an effective focal lens of the lens system; (ii) TTL is a distance from the outside surface of the first substrate to an image plane; (iii) F1, F2, and F3 are focal lengths of the first lens, the second lens, and the third lens, respectively; and (iv) V2 is an Abbe number of the second lens, and V3 is an Abbe number of the third lens.

17. The lens system of claim 16, wherein the first lens, the second lens, the third lens, the fourth lens, and the fifth lens are made of reflow-compatible materials.

18. The lens system of claim 16, wherein the lens system comprises a wafer-level lens.

19. A wafer-level lens system, comprising:
   a first substrate having an outside surface;
   a first lens having a planar surface in contact with the first substrate opposite to the outside surface and a concave aspheric surface;
   a second substrate;

a second lens having a convex aspheric surface facing the first lens and a planar surface in contact with the second substrate;
a third lens having a planar surface in contact with the second substrate and a concave aspheric surface;
wherein the second substrate is sandwiched between the second lens and the third lens;
a third substrate;
a fourth lens having a convex aspheric surface facing the third lens and a planar surface in contact with the third substrate; and
a fifth lens having a planar surface in contact with the third substrate and a concave aspheric surface;
wherein the third substrate is sandwiched between the fourth lens and the fifth lens;
wherein the first lens, the second lens, the third lens, the fourth lens, and the fifth lens are made of reflow-compatible materials;

wherein the lens system satisfies the following conditions:

$$0.2 < EFFL/TTL < 0.5;$$

$$-0.75 < EFFL/F1 < -0.35;$$

$$1 < EFFL/F2 < 1.4;$$

$$-0.65 < EFFL/F3 < -0.15;$$

$$V2 > V3 \text{ and } V3 < 35;$$

wherein: (i) EFFL is an effective focal lens of the lens system; (ii) TTL is a distance from the outside surface of the first substrate to an image plane; (iii) F1, F2, and F3 are focal lengths of the first lens, the second lens, and the third lens, respectively; and (iv) V2 is an Abbe number of the second lens, and V3 is an Abbe number of the third lens.

* * * * *